Nov. 14, 1939.  R. M. CALKINS  2,179,812
PLUG FOR USE IN CEMENTING WELLS
Filed June 17, 1938  2 Sheets-Sheet 1

INVENTOR.
RALPH M. CALKINS.
BY
ATTORNEY.

Nov. 14, 1939.  R. M. CALKINS  2,179,812
PLUG FOR USE IN CEMENTING WELLS
Filed June 17, 1938    2 Sheets-Sheet 2

INVENTOR.
RALPH M. CALKINS.
BY
ATTORNEY.

Patented Nov. 14, 1939

2,179,812

UNITED STATES PATENT OFFICE 2,179,812

PLUG FOR USE IN CEMENTING WELLS

Ralph M. Calkins, Fullerton, Calif.

Application June 17, 1938, Serial No. 214,248

8 Claims. (Cl. 166—1)

My invention relates to plugs employed in the cementing of oil wells and has particular reference to a plug adapted for the cementing of deep wells.

In the drilling of oil wells it is the practice to extend an earth bore to the oil and gas bearing formations and to extend into this bore a casing to constitute a metallic lining for the bore through which the oil and gas may be conveyed to the ground surface. The earth bore usually extends through one or more water bearing formations so that it is necessary to form a watertight bond between the casing and the walls of the bore, at least below the lowermost of such water bearing formations, to prevent water from such formations from reaching the oil and gas formations or mixing with the oil and gas produced by the well.

The common method sealing the casing and the bore consists in passing a calculated quantity of cement grout down through the casing to be ejected therefrom and forced into the space between the exterior of the casing and the interior of the bore where such cement will set and form a water-proof seal between the walls of the bore and the exterior of the casing.

The cementing operations usually include the steps of circulating mud or water through the casing and up through the space outside the casing to clean the space between the casing and the drill hole. Then a "slug" of cement grout is introduced into the casing and is forced by the circulating fluid down through the casing to the point at which it is desired to cement off the well, at which point the cement grout will be forced out of the casing and up into the space between the casing and the bore to set within this space and form the water-tight seal.

The circulation fluid must be prevented from mixing with the cement during the passage of the slug of cement down through the casing and for this purpose a bottom plug is inserted into the casing before the entry of the cement to act as a barrier separating the lower end of the slug of cement grout from the upper end of the column of the circulation fluid lying below it, and an upper plug is inserted on top of the slug of cement to prevent the circulation fluid pumped in above it from mixing with the cement.

In order to remove the plugs from the well after the cementing operation is completed, the plugs must be made of some material which may be readily drilled out and for this purpose it has been the common practice to construct such plugs of wood provided with one or more leather disc-like washers which are deformed into cups to act as flexible seals between the plug and the interior walls of the casing when the fluids are forced down upon the plugs. Considerable difficulty, however, has been encountered in the use of such wooden plugs with leather or similar cup washers due to the fact that the compressive forces exerted upon the cupped leathers is in the same direction as the natural tendency of the leathers to move and further due to the fact that the compressive action occasioned between the walls of the casing and the leathers causes them to wear rapidly and become so thin that they tend to curl over and invert, allowing the liquids above and below the plugs to mix with each other. Another disadvantage of the use of wooden plugs is that in cementing relatively deep wells the passage of the plugs through the great length of casing wears, abrades and cracks the wood portions of the plugs as well as the leathers, it frequently being found that the wood portion of the plugs has been so disintegrated before its arrival at the cementing position as to be of no value as a barrier between the cement and the circulation fluid.

It is therefore an object of my invention to provide a cementing plug which may be substituted for the wood and leather plugs now in use and which comprises a body portion constructed of metal which is relatively non-frangible and which is provided with preformed resilient washers, the natural resilience of which tends to oppose inversion of the packing members.

Another object of my invention is to provide a plug of the character set forth in the preceding paragraph in which the packing members are formed as rubber cups, pre-molded into their cup-like shape whereby the normal resilience of the material tends to hold the packing members in their cupped shape.

Another object of my invention is to provide a plug of the character set forth in which the metal base of the plug is constructed as a relatively thin shell of metal to facilitate its being drilled out after the cementing operations are complete.

Other objects and advantages of my invention will be apparent from a study of the following specifications, read in connection with the accompanying drawings, wherein Fig. 1 is a vertical sectional view through a typical section of oil well drill hole and casing and illustrating the manner in which my cementing plug may be interposed between the upper end of a slug of cement and the lower end of a column of circulation fluid employed to drive the cement down through the casing;

Figure 1:
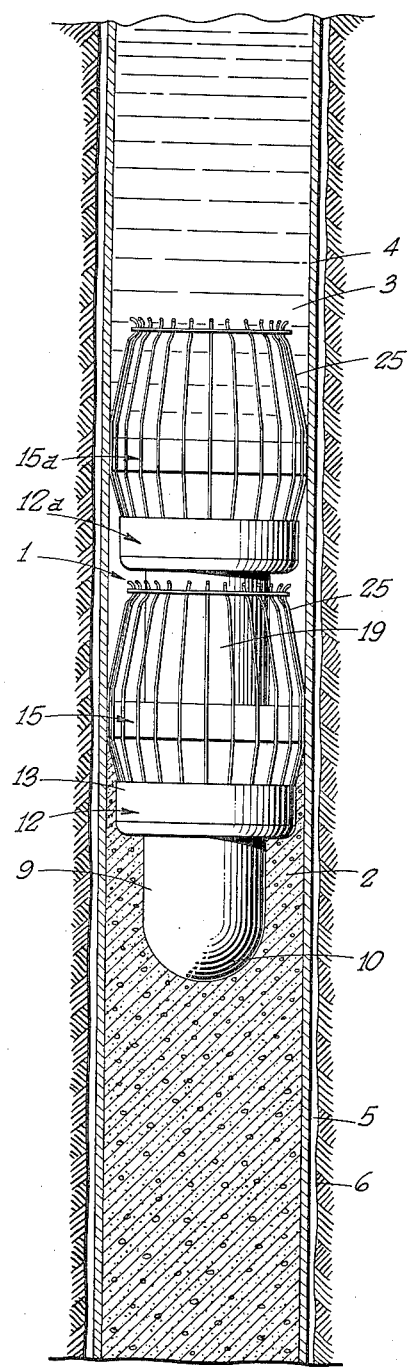

Referring to the drawings, I have illustrated in Fig. 1 a cementing plug 1 constructed in accordance with my invention as being interposed between the upper end of a column of cement grout 2 and the lower end of a column of circulation fluid 3 which has been pumped into the well casing 4 to force the slug of cement 2 down through the casing to the desired point at which the cement will be forced outwardly and upwardly along the space 5 between the casing 4 and the walls of the drill hole or well bore 6.

Figure 2:
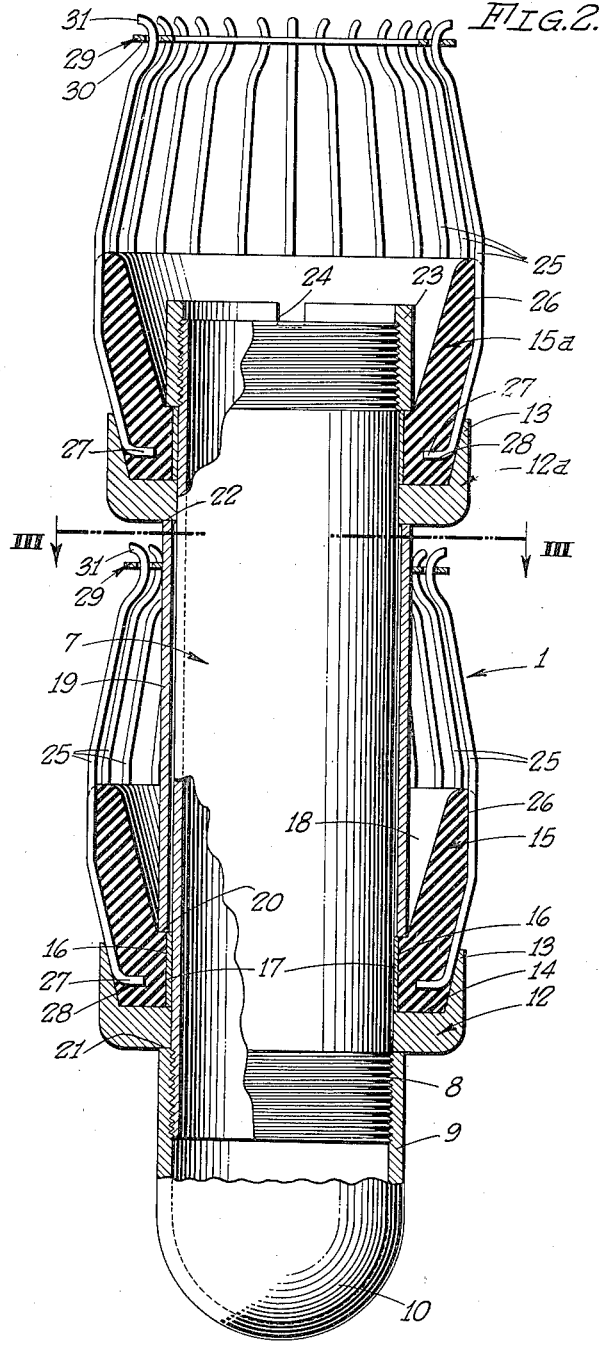
Fig. 2 is an enlarged vertical sectional view taken through the form of plug shown in Fig. 1.
Figure 3:
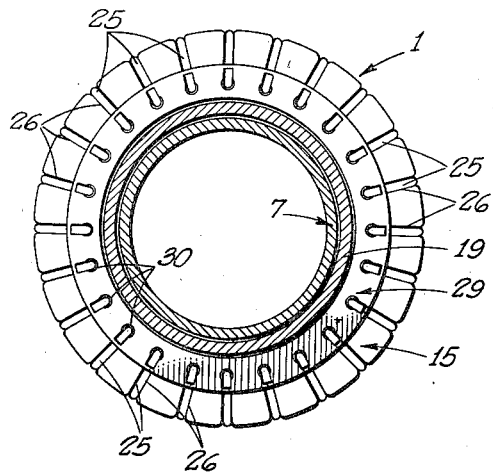
Fig. 3 is a horizontal sectional view taken through the plug shown in Fig. 2 along the lines III—III of Fig. 2.

The plug 1 includes a body portion which, in the form of the device illustrated in Figs. 1, 2 and 3, includes a nipple or short length of metal pipe 7 threaded at its lower end as indicated at 8 to receive a nosepiece or cap 9, preferably rounded as indicated at 10 to constitute a guide by which the plug may readily pass down curves or irregularities in the casing 4. The nosepiece or cap 9 closes off the lower end of the passage 11 through the nipple 7 so that any fluids which may be disposed above the nipple 7 will not be permitted to pass into contact with any fluids located below the cap or nosepiece 9.

The nipple 7 constitutes a base or support upon which a packing carrier 12 may be mounted, such carrier being preferably constructed as a washer making a sliding fit with the exterior of the nipple 7 and being provided with an upwardly extending annular flange 13 to form the washer into a substantially cup-like shape, the interior of which constitutes a seat 14 into which may be fitted the lower end of a packing sleeve 15. The packing sleeve 15 is preferably formed of relatively tough but resilient rubber, with or without fabric or similar reinforcement molded therein. The sleeve 15 is preferably initially molded into substantially the shape shown in Fig. 2 with a central opening 16 adapted to make a sliding fit with exterior walls of the nipple 7 or, if desired, this bore may be lined with a relatively thin metallic liner ring 17 to insure that it may be readily slid along the nipple 7 in assembling and disassembling the plug and its packing members. The walls of the packing member 15 are preferably molded so as to normally flare upwardly and outwardly to provide at the upper end of the sleeve a space 18 between the walls of the packing member and the exterior of the nipple 7, into which fluid material above the plug may pass and by which pressure exerted upon such fluid will tend to force the walls of the packing member out into tight sealing relation with the interior of the casing 4. At this point it will be noted that the normal resilience of the sleeve 15 is opposed to the outward movement of the upper or free end of the sleeve 15 and the resilience of this material therefore tends to oppose the rolling over or inversion of the cup-like structure formed by the sleeve 15. As illustrated in Fig. 2, two or more packing carriers and packing members may be assembled upon the same base nipple 7 in tandem relation so as to provide a series of seals interposed between the fluids above and below the plug, effectively preventing intermixing of the fluids.

As illustrated in Fig. 2, a second packing carrier 12a, constructed in all respects identical with the packing carrier 12, is provided upon the upper end of the nipple 7 and constitutes a seat and support for a second packing member or cup 15a, the packing carrier 12a being spaced away from the packing carrier 12 by means of a spacer sleeve 19 which may make a loose fit about the nipple 7, one end 20 of the sleeve 19 bearing upon the upper surface of the packing member 15 to securely clamp this packing member and its carrier 12 down upon the shoulder 21 on the nosepiece or cap 19 while the upper end 22 of the spacer sleeve abuts the lower surface of the carrier 12a.

The entire assembly of nipple, spacer sleeve, carriers and packing members may be held together by means of an annular clamping nut 23 threaded upon the upper end of the nipple 7, suitable recesses or slots 24 being provided in the upper edge of the nut 23 to permit a spanner wrench to be engaged therewith to tighten or clamp the nut 23 down upon the upper packing member 15a and thus to exert sufficient pressure to clamp all of the parts in their assembled relations as shown in Fig. 2.

From the foregoing description it will be noted that the entire plug is constructed solely from metallic members 7, 9, 12, 12a, 19 and 23, which constitute all of the supporting structure necessary to carry the packing members 15 and 15a and each of these metallic parts should be constructed of a suitable metal or alloy which is relatively tough and has relatively high tensile strength but yet of such character that it may be readily drilled away by the use of the ordinary earth boring drilling tools after the cementing operations have been finished. One metal of this character is known under the trade name of "Securaloy", constituting essentially an aluminum alloy having all of the peculiar characteristics most desirable for this purpose and in addition having the characteristic that its specific gravity is only slightly greater than shale so that as it is drilled away the cuttings will readily circulate out of the hole with the drilling fluid.

The carriers 12a should be constructed with a diameter only slightly less than the internal diameter of the casing through which the plug is to pass and thus any wear of the metallic parts of the plug against the walls of the casing will be taken by the carriers. The carriers should be formed with relatively heavy walls so as to permit substantial wearing away of these members without so weakening them as to allow release of the packing members 15 or 15a.

In order to prevent undue wearing away of the packing members 15 and 15a as they slide down through the casing, wearing members may be provided as illustrated comprising a substantially cage-like structure formed of a series of vertically extending wires or rods 25 spaced about the exterior of the packing members 15 and 15a. The lower ends of the wires 25 may be set into longitudinally extending recesses or grooves 26 molded into the exterior walls of the packing members 15 and 15a while the extreme ends 27 of the wires 25 may be turned inwardly to be received in suitable radially extending recesses 28 formed in the lower portion of each of the packing members 15 or 15a in such location as to dispose the ends 28 of the wires 25 below the flanges 13 of the carriers 12 or 12a. Thus the wires may be assembled upon the packing members 15 or 15a after the molding of these members and the flanges of the carriers will act to hold the wires in place about the packing members. The wires 25 preferably extend a considerable distance above the upper ends of the packing members 15 or 15a and may be normally restrained against outward radial movement relative to the packing members by means of a retaining ring 29 provided with a plurality of holes 30 at spaced intervals therearound to receive hooked ends 31 formed upon the upper ends of the wires 25.

However, it will be noted that when liquid is forced down upon the packing members 15 or 15a, the pressure will be sufficient to expand the packers 15 or 15a outwardly into contact with the casing walls and the wires 25 should be sufficiently yielding to exert little or no restraining force opposing such expansion.

However, the wires, like the remainder of the metallic parts of the plug, may be made of Securaloy or similar material so that while they provide yielding metallic wearing surfaces for contact with the walls of the casing, they may be readily drilled out or ground up by the drilling tools after the cement of the well is completed.

Figure 4:
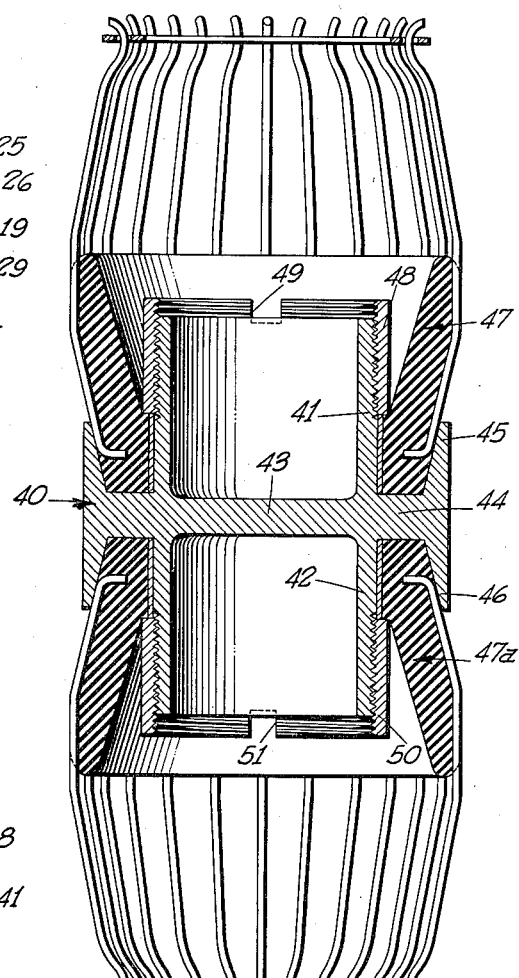
Fig. 4 is a vertical sectional view taken through a modified form of plug constructed in accordance with my invention.
Figure 5:
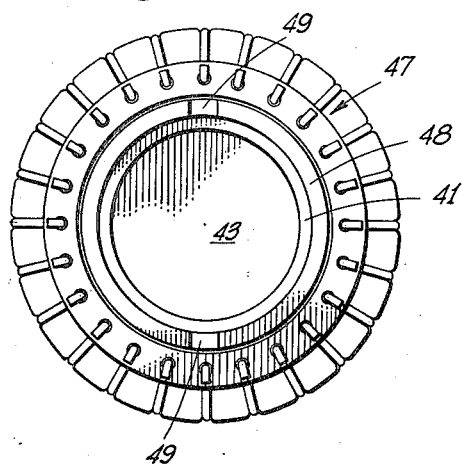
Fig. 5 is a top plan view of the form of plug shown in Fig. 4.

In Figs. 4 and 5 I have illustrated a modified form of plug which employs the principles of my invention as comprising a base or body member 40 as shown in Fig. 4, which includes a relatively thin-walled upwardly projecting boss 41 and a similar thin-walled downwardly projecting boss 42 formed integrally with a laterally extending partition member 43 which will prevent passage of fluids downwardly through the interior of the body member 40. A radially extending flange 44 is formed upon and extends outwardly from the exterior walls of the bosses 41 and 42 and is provided with upwardly and downwardly projecting annular flanges 45 and 46, respectively, the flange 45 and the exterior walls of the boss 41 constituting a seat into which the lower end of a packing member 47 may seat, the packing member 47 being constructed in all respects identical with the packing member 15 or 15a described with reference to Figs. 1, 2 and 3. The packing member 47 may be held in place upon the body 40 by means of an annular nut 48 threaded upon the upper end of the boss 41 and arranged to be tightened by means of a suitable spanner wrench insertable into slots 49 formed upon the nut 48.

The space between the flange 46 and the exterior walls of the boss 42 constitutes an inverted seat for the reception of a second packing member 47a (which like packing member 47 is identical in all respects to the packing members 15 or 15a described with reference to Fig. 1). The packing member 47a is held in assembled relation upon the body 40 by means of a second annular nut 50 threaded upon the boss 42 and tightened in place thereon by means of any suitable spanner wrench engaging recesses 51 formed in the nut 50.

In this form of the device the plug comprises a hollow substantially thin-walled body structure which is formed of Securaloy or similar drillable metal while the packing members 47 and 47a provide oppositely disposed cup-like packings or gaskets, each of which is directed toward the fluid with which it comes in contact in such manner as to prevent the leakage of the fluids by their respective packing members.

It will be observed therefore that I have provided a plug which may be successfully used in place of the wood and leather plugs now employed and which may be employed under the most adverse conditions with the assurance that no leakage of the cement and circulation fluids relative to each other will occur and with the assurance that the barriers interposed between the slug of cement and the circulation fluid will remain intact until the entire length of casing down to the point at which it is desired to eject the cement has been traversed by the plug.

While I have shown and described the preferred embodiment of my invention, I do not desire to be limited to any of the details of construction shown or described herein, except as defined in the appended claims.

I claim:

1. In a plug for use in cementing wells through well casing, a body comprising a hollow tubular member formed of substantially non-frangible material capable of being drilled out by earth boring tools, means forming a barrier extending across said tube to prevent passage of fluids therethrough, and one or more molded rubber packing sleeves surrounding the body member, one end of each of the sleeves being fixed to the body member and the other end of the sleeve being free to expand radially under the influence of fluid pressure exerted on said plug whereby the normal resilience of the rubber material opposes expansion of the free end of said sleeve.

2. In a plug for use in cementing wells through well casing, a body comprising a hollow tubular member formed of substantially non-frangible material capable of being drilled out of earth boring tools, means forming a barrier extending across said tube to prevent passage of fluids therethrough, one or more cup-like packing carriers on said tubular member and extending radially outward therefrom to define seats, molded packing sleeves surrounding said body member, one end of each of which is receivable in said seats, and means on said tubular member for engaging and clamping said ends of said sleeves in said seats.

3. In a plug for use in cementing wells through well casing, a body member comprising an elongated nipple, a cap closing one end of said nipple, a packing carrier member surrounding said nipple and having an annular flange thereon spaced from said nipple, said flange and carrier forming an annular seat extending about said nipple, a packing sleeve surrounding said nipple, one end of which extends into the seat formed by said carrier, and clamping means extending about said nipple and extending interiorly of said sleeve to engage said end of said sleeve to clamp the same against said seat, said nipple, cap, carrier and clamping means being formed of non-frangible metal capable of being drilled out by earth boring tools.

4. In a plug for use in cementing wells through well casing, a body member comprising an elongated thin walled nipple, a thin walled cap closing one end of said nipple, a packing carrier member surrounding said nipple and having an annular flange thereon spaced from said nipple, said flange and carrier forming an annular seat extending about said nipple, a packing sleeve surrounding said nipple, one end of which extends into the seat formed by said carrier, and clamping means extending about said nipple and extending interiorly of said sleeve to engage said end of said sleeve to clamp the same against said seat, said nipple, cap, carrier and clamping means being formed of non-frangible metal capable of being drilled out by earth boring tools.

5. In a plug for use in cementing wells through well casing, a body member comprising an elongated nipple, a cap threaded about one end of said nipple, a packing carrier comprising a washer slidable upon said nipple and resting upon said cap, said washer having an annular flange extending along and spaced outwardly from said nipple to define a cup-like seat, a packing sleeve surrounding said nipple, one end of which extends into the seat formed by said carrier, a tubular spacing member surrounding said nipple, one end of which engages said end of said packing sleeve to clamp said sleeve into said seat, a second carrier on said nipple engaging the opposite end of said spacer, a second packing sleeve on said nipple, one end of which is received in the seat formed by said second carrier, and a clamping nut threaded upon said nipple and engaging said end of said second sleeve to clamp all of said sleeves and said carriers and said spacer in place upon said nipple, said nipple, cap, carriers, spacing member and clamping nut being formed of non-frangible metal capable of being drilled out by earth boring tools.

6. In a plug for use in cementing oil wells through well casing, a body member formed of non-frangible metal capable of being drilled out by earth boring tools and having a pair of packing carriers including annular flanges extending in opposite directions along said body and longitudinal bosses extending in opposite directions along said body concentric with and spaced from said flanges, a pair of packing sleeves one end of each of which is receivable between said flanges and said bosses, and clamping nuts on each of said bosses engaging said ends of said packing sleeves to clamp the same upon said carriers.

7. In a plug for use in cementing oil wells through well casing, the combination of: a pair of cone-shaped resilient packing sleeves for insertion in said casing with the axes of said cones aligned with the axis of said casing and disposed with the apices of said cones adjacent each other; a carrier for said sleeves formed of a non-frangible metal capable of being drilled out by earth boring tools, said carrier including a disk disposed transversely of said aligned axes and carrying a pair of oppositedly disposed annular flanges encompassing the smaller end of each of said sleeves; and securing means on said carrier disposed interiorly of said sleeves for clamping said sleeves to said carrier.

8. In a plug for use in cementing oil wells through well casing, the combination of: a pair of cone-shaped resilient packing sleeves for insertion in said casing with the axes of said cones aligned with the axis of said casing and disposed with the apices of said cones adjacent each other; a carrier for said sleeves formed of a non-frangible metal capable of being drilled out by earth boring tools, said carrier including a disk disposed transversely of said aligned axes and having formed integrally therewith a pair of oppositely disposed annular flanges encompassing the smaller end of each of said sleeves, and a pair of oppositely disposed tubular bosses formed integrally with said disk and disposed within each of said sleeves; and securing means cooperating with said bosses for clamping said sleeves to said carrier.

RALPH M. CALKINS.